United States Patent [19]
Nesseth

[11] 3,915,594
[45] Oct. 28, 1975

[54] MANURE STORAGE PIT PUMP

[76] Inventor: Clifford A. Nesseth, R.R. No. 1, Box 29, Dafter, Mich. 49724

[22] Filed: Jan. 14, 1974

[21] Appl. No.: 433,402

[52] U.S. Cl. .................................. 417/231; 415/74
[51] Int. Cl.² ................... F04D 29/28; F04D 29/38
[58] Field of Search ............ 415/74, 143, 148, 149; 417/231, 234

[56] References Cited
UNITED STATES PATENTS

| | | | |
|---|---|---|---|
| 2,134,396 | 10/1938 | Campbell | 415/143 |
| 2,498,143 | 2/1950 | Struckmann | 415/143 |
| 2,698,583 | 1/1955 | House | 417/231 |
| 2,896,543 | 7/1959 | Ogles | 415/143 |
| 3,170,646 | 2/1965 | Springer | 417/231 |
| 3,371,614 | 3/1968 | Crisafulli | 417/231 |

FOREIGN PATENTS OR APPLICATIONS

| | | | |
|---|---|---|---|
| 968,744 | 5/1950 | Germany | 417/234 |
| 450,489 | 9/1927 | Germany | 415/148 |
| 803,329 | 1/1951 | Germany | 415/148 |

Primary Examiner—William L. Freeh
Assistant Examiner—G. P. LaPointe
Attorney, Agent, or Firm—Robert G. Mentag

[57] ABSTRACT

A manure storage pit pump for attachment to a tractor having a power output shaft and a hitch means for loading manure into a liquid manure transfer tank mounted on a vehicle such as a spreader vehicle or a truck, or for agitating manure in a storage pit. The pump includes a support frame for detachable engagement with the hitch means, and an elongated main frame having one end operatively supported by the support frame. An elongated drive shaft is rotatably carried on the main frame and it is operatively connected to an impeller means which is carried on the main frame. The drive shaft is operatively connected to the usual tractor power output shaft for rotating the drive shaft. An auger means is operatively attached to the drive shaft for moving manure from the manure storage pit into the impeller means. A transfer pipe means is operatively connected to the impeller means for receiving manure from the impeller means and selectively conveying the manure either to the tank on the spreader vehicle or truck, or back into the storage pit for agitating the manure in the storage pit.

8 Claims, 6 Drawing Figures

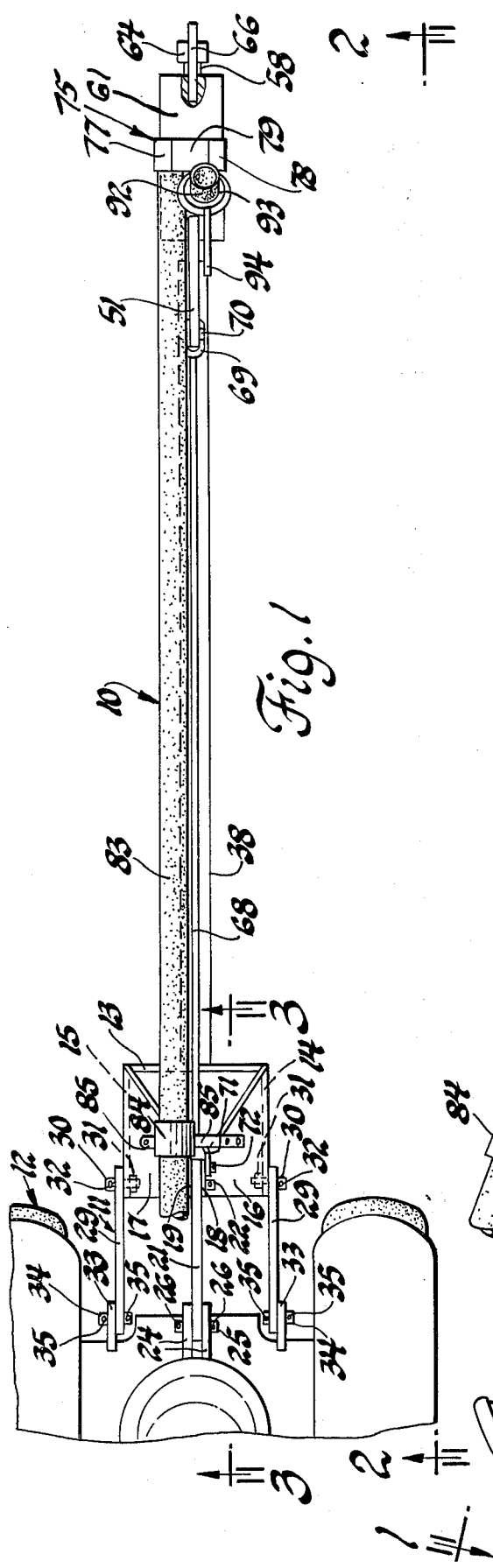

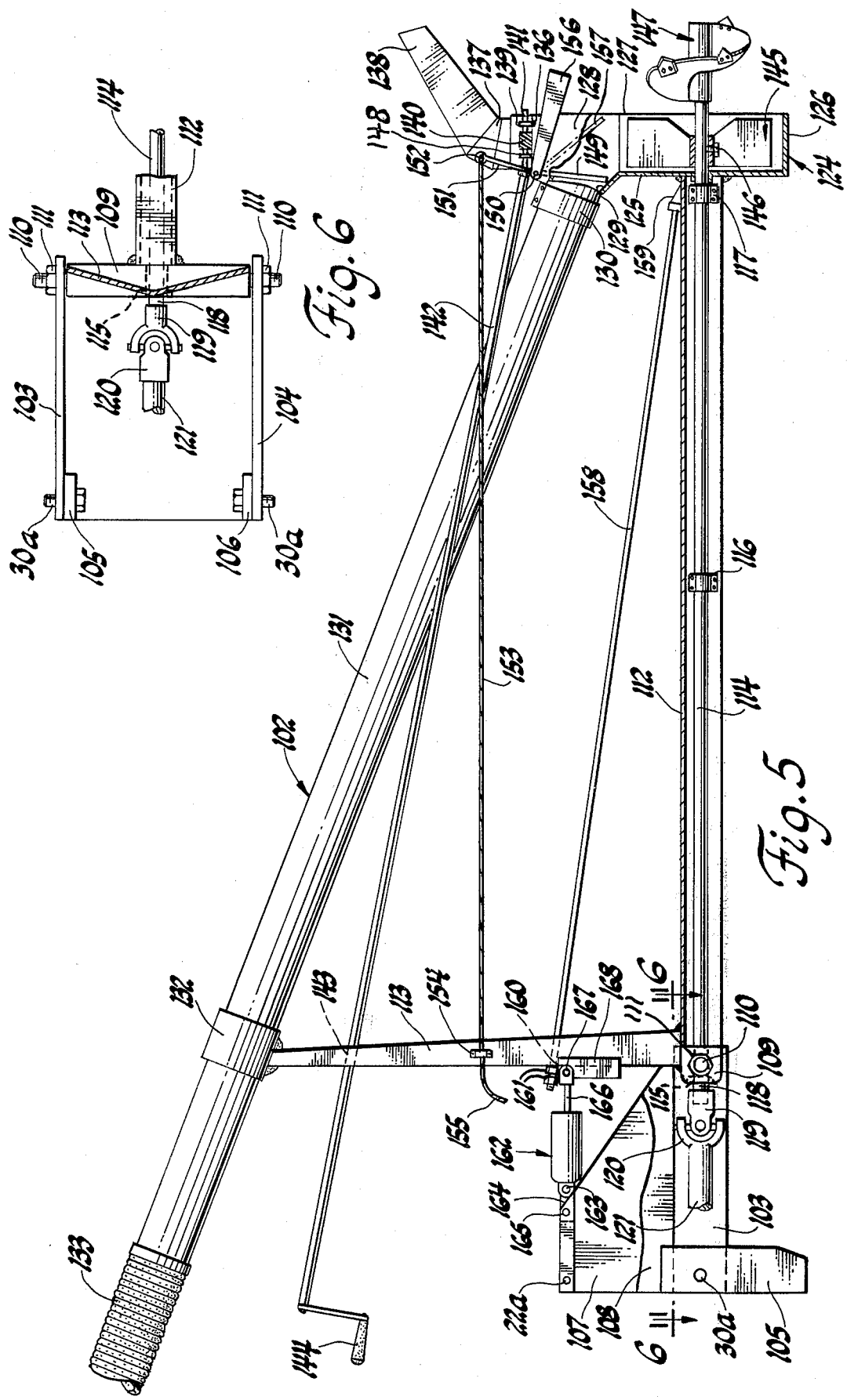

MANURE STORAGE PIT PUMP

SUMMARY OF THE INVENTION

This invention relates to an apparatus for transferring manure from a manure storage pit to a tank mounted on a vehicle, such as a spreader vehicle or a truck, for spreading the manure on a field, or for transferring manure from one position to another in a storage pit, for agitating the manure in the manure storage pit.

It is a common practice to provide storage pits for manure where the manure is stored until the appropriate time of the year when it is desired to spread the manure on the fields. One of the problems in the storage of manure is the problem of agitating and stirring up the manure. Another problem is the moving of the manure from a storage pit into a suitable spreading apparatus, as for example, a liquid tank on a spreader vehicle or truck. The manure storage pit pump of the present invention provides a portable and efficient transfer apparatus for transferring manure from a manure storage pit into a closed tank for liquid manure, with the tank being mounted on a spreader vehicle or truck, so that the manure can be conveyed to a field and then pumped out onto the field.

In view of the foregoing, it is an important object of the present invention to provide a novel and improved manure storage pit pump which is simple and compact in construction, economical to manufacture, and efficient in operation.

It is another object of the present invention to provide a manure storage pit pump for attachment to a tractor having a power output shaft and hitch means, and which includes a support frame for detachable engagement with the hitch means and an elongated main frame having one end operatively supported by said support frame. An elongated drive shaft is rotatably supported on the main frame and one end of the drive shaft is operatively connected to a tractor power output shaft for rotating said drive shaft. An impeller means is carried on the main frame and is operable by the drive shaft. An auger means is operatively attached to the end of the drive shaft for moving manure from a manure storage pit into the impeller means. A pipe means is operatively connected to the impeller means for receiving manure from the impeller means, and selectively conveying the manure either to a liquid tank on a spreader vehicle or back into the storage pit for agitating the manure in the pit.

It is another object of the present invention to provide a novel and improved manure storage pit pump which is light in weight, portable, and which provides an apparatus for transferring manure from a manure storage pit into a liquid manure tank in a short period of time.

It is still another object of the present invention to provide a manure storage pit pump which is adapted to be pivotally supported on a tractor for quickly and easily moving the pump into an operative position in a manure storage pit.

Other objects, features and advantages of this invention will be apparent from the following detailed description, appended claims, and the accompanying drawings.

BRIEF DESCRIPTION OF THE DRAWINGS

FIG. 1 is a top plan view of a manure storage pit pump made in accordance with the principles of the present invention, taken along the line 1—1 in FIG. 2, and looking in the direction of the arrows.

FIG. 2 is a front elevational view of the structure illustrated in FIG. 1, taken along the line 2—2 thereof, and looking in the direction of the arrows.

FIG. 5 is a side elevational view, partly in section, of a second embodiment of a manure storage pit pump made in accordance with the principles of the present invention.

FIG. 6 is a fragmentary, horizontal section view of the structure illustrated in FIG. 5, taken along the line 6—6 thereof, and looking in the direction of the arrows.

DESCRIPTION OF THE PREFERRED EMBODIMENTS

Figure 3:
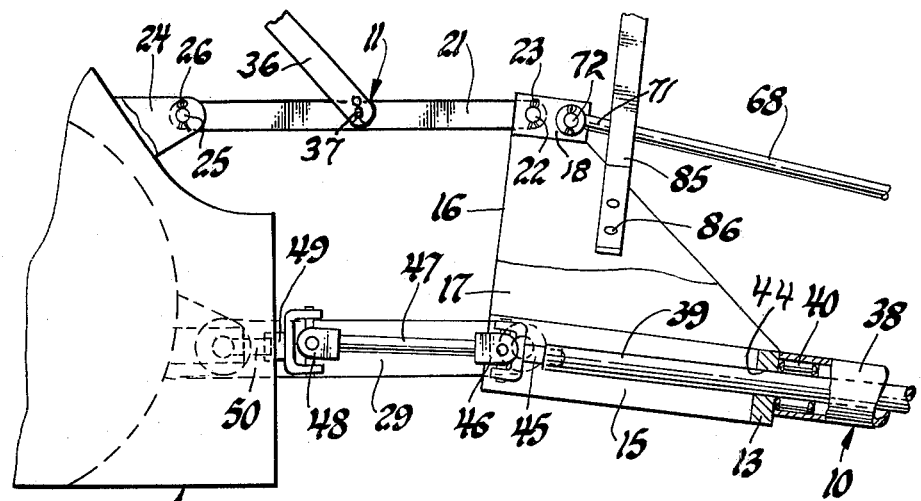
FIG. 3 is a fragmentary, elevational view, partly in section, of the structure illustrated in FIG. 1, taken along the line 3—3 thereof, and looking in the direction of the arrows.

Referring now to the drawings, and in particular to FIGS. 1 and 2, the numeral 10 generally designates a manure storage pit pump made in accordance with the principles of the present invention. The numeral 11 generally designates a conventional three-point tractor hitch employed for operatively attaching the pit pump 10 to a conventional tractor generally indicated by the numeral 12.

As best seen in FIG. 1, the pit pump 10 includes a carrier member or support frame which comprises a transverse bar or member 13 that is fixedly secured, as by welding, to the front ends of a pair of laterally spaced apart, longitudinally extended frame bars or members 14 and 15. As shown in FIGS. 1 and 3, the pit pump support frame includes a pair of sloping side plates 16 and 17 which converge upwardly. The lower ends of the frame side plates 16 and 17 are fixedly secured to the upper ends of the frame longitudinal members 14 and 15, respectively, by any suitable means, as by welding. As shown in FIGS. 1 and 3, the upper ends of the frame side plates 16 and 17 are bent so as to be disposed in a vertical plane and in a position laterally spaced apart from each other so as to form two laterally spaced apart end members 18 and 19, respectively.

As shown in FIGS. 2 and 3, the three-point tractor hitch 11 includes an upper link 21 which has its rear end disposed between the frame side plate members 18 and 19 and pivotally secured thereto, by any suitable means, as by a pivot pin 22 and a pair of cotter pins 23. The front end of the hitch upper link 21 is disposed between a laterally spaced apart pair of attachment arms 24 (FIG. 3) which are fixedly secured to the tractor 12 by any suitable means, as by welding. The hitch link 21 is pivotally attached to the attachment arms 24 by any suitable means, as by a pivot pin 25 and a pair of cotter pins 26.

As shown in FIG. 1, the three-point tractor hitch 11 further includes a pair of lower links 29 which are pivotally attached at their front ends to the tractor 11 and at their rear ends to the sides of the pump support frame members 14 and 15. The rear ends of each of the hitch lower links 29 are pivotally attached by a hitch pivot pin 30 to the frame longitudinal bars 14 and 15.

The pivot pins 30 are each retained in position by a suitable lock nut 31 which is threadably mounted on the inner end of the pin 30 and a cotter key 32 mounted on the outer end of the pin. A pair of support arms 33 are fixedly mounted, as by welding, to the tractor 12 in positions laterally spaced apart, on opposite sides of the support arms 24 and in positions spaced apart downwardly therefrom. The front ends of the hitch lower links 29 are each pivotally attached to one of the support arms 33 by means of a hitch pivot 34 and a pair of cotter keys 35. The pump support frame may be pivoted about the pivot pins 32 to different working positions by employing an upper link 21 to a desired length to provide the angular disposition desired of the pit pump relative to the ground. As shown in FIG. 2, the support frame is disposed so as to support the pump in a position at an acute angle relative to the ground surface. As shown in FIG. 3, a hitch lift arm 36 is pivotally attached by a pivot pin 37 to the upper hitch link 21. The lift arm 36 would be attached to the usual fluid cylinder on the tractor 11 for raising and lowering the hitch 11 and pump 10.

The pump 10 further includes an elongated main frame member 38 which may be of any suitable cross section as for example, tubular in cross section. The front end of the elongated tubular main frame 38 is fixedly mounted to the transverse support frame member 13 by any suitable means, as by welding. Rotatably mounted within the tubular main frame 38 is an elongated, longitudinally extended drive shaft 39 which is adapted to be rotated in a counterclockwise direction, as viewed from the left end of the structure illustrated in FIG. 2. The shaft 39 is rotatably supported at the open front end of the tubular main frame 39 by a suitable bearing block 40. The shaft 39 is provided with an intermediate bearing block 41 (FIG. 2). The rear end of the shaft 39 is rotatably supported by a suitable bearing block 42.

As best seen in FIG. 3, the front end of the drive shaft 39 extends through a suitable opening 44 in the support frame transverse cross bar 13. The front end of the shaft 39 extends inwardly into the support frame and is operatively attached to the output portion 45 of a first universal joint means, as by being splined thereto. The input portion of the universal joint means is fixedly attached by any suitable means to the rear end of an intermediate short shaft 47. The front end of the shaft 47 is operatively attached by any suitable means to the output portion 48 of a second universal joint means. An input portion 49 of said second universal joint means is splined, or attached by any other suitable means, to the tractor power take-off or output shaft 50 of the tractor 11.

As shown in FIG. 2, the rear end of the tubular main frame 38 has fixed thereto a pair of support brackets 51 and 52 which are disposed diametrically opposite to each other and which are also fixed, as by welding, to the rear end portion of an auger housing 61. The auger housing 61 comprises an elongated tubular member which is open at the rear and front ends 53 and 54, respectively. An auger means, generally indicated by the numeral 55, is rotatably mounted within the auger housing 61. The auger means 55 includes a left hand auger member 56 and a right hand auger member 57 which are fixedly mounted on a shaft 58.

Figure 4:
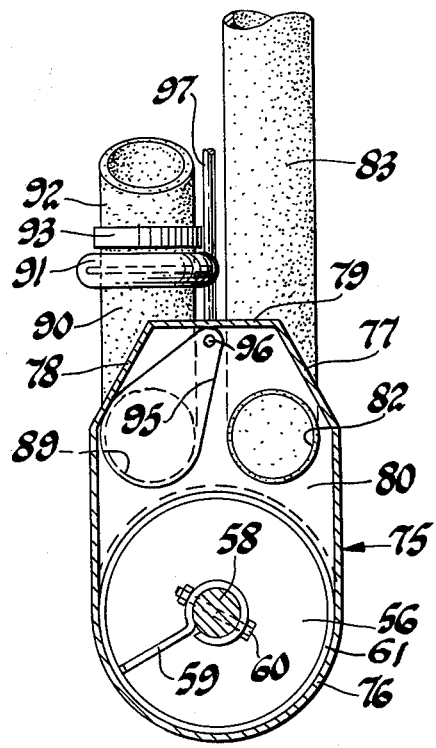
FIG. 4 is a fragmentary, enlarged elevational section view of the structure illustrated in FIG. 2, taken along the line 4—4 thereof, and looking in the direction of the arrows.

As shown in FIGS. 2 and 4, a slinger paddle or impeller 59 is fixedly mounted on a pump shaft 58 in a central position between the left hand auger member 56 and the right hand auger member 57. As shown in FIG. 4, the impeller 59 is releasably secured to the shaft 58 by any suitable means, as by a bolt and nut means 60. As shown in FIG. 2, the front end of the auger main shaft 58 is operatively connected to the rear end of the pump drive shaft 39 by any suitable means, as by a splined connection, and a suitable attachment bolt and nut means, indicated by the numeral 63. The rear end of the auger means main shaft 58 is rotatably mounted in a suitable bearing block 64 that is fixedly supported by a support bracket formed by the integrally connected bracket members 65, 66, and 67.

As best seen in FIG. 2, the pump 10 includes an elongated support rod or truss 68 which has a pivot fitting 69 in the rear end thereof that is pivotally attached by a suitable pivot pin 70 to the bracket 51. The front end of the support rod 68 is provided with a suitable pivot fitting 71 that is pivotally attached by a suitable pivot pin 72 to the upper end member 18 of the support frame.

As shown in FIGS. 1, 2 and 4, the impeller 59 is enclosed by a suitable housing, generally indicated by the numeral 75. As shown in FIG. 4, the impeller housing 75 includes a lower end portion which has a semicircular lower wall and a pair of vertically disposed side walls. The upper end of the housing 75 includes a pair of upper end of converging side walls 77 and 78 which are integral with the lower end portion 76 and also integral with a horizontal top end wall 79.

As shown in FIG. 2, the impeller housing 75 is provided with a front end wall 80 and a rear end wall 81. As shown in FIG. 4, the auger housing 61 is formed so as to extend through the housing 75, yet have an opening on the upper side thereof as it passes through the housing 75, to permit the impeller 59 to force manure upwardly into the upper end of the impeller housing 75.

As shown in FIG. 4, a first pump outlet port 82 is formed through the impeller housing back wall 80 and it has operatively mounted therein the inlet end of an elongated transfer pipe 83. As shown in FIG. 2, the pipe 83 is supported by a support bracket or collar 84 which is fixedly mounted on the upper end of a pair of pipe support brackets 85. As illustrated in FIG. 2, the lower ends of the pipe support brackets 85 are fixedly secured to the support frame side plates 16 and 17 by suitable machine screws 86. Manure forced upwardly into the upper end of the impeller housing 75 is forced through the transfer pipe 83 to a closed tank for liquid manure which may be carried on a vehicle, such as a spreader or truck.

As shown in FIG. 4, the impeller housing 75 is provided with a second pump outlet port 89 which has operatively mounted therein one end of a pump bypass outlet pipe 90. As shown in FIG. 4, the upper end of the bypass outlet pipe 90 is operatively connected to the lower end of a rotatable bypass pipe or spout 92, by means of a suitable rotatable pipe joint 91. As shown in FIG. 2, a ring 93 is fixedly attached to the spout 92 and it has fixedly attached thereto a handle 94.

As shown in FIG. 4, a selector valve or two-way valve 95 is swingably mounted on a shaft 96 for swinging movement between a first position blocking the first outlet port 82 and a second position blocking the second outlet port 89. FIG. 4 shows the swingably mounted selector valve 95 moved to a position so as to block manure flow out of the impeller housing 75 and out through the second outlet port 89. If it is desired to agitate the manure in a manure storage area then the swingably mounted selector valve 95 is moved counter-clockwise, as viewed in FIG. 4, to a position so as to cover the pipe outlet 82 and permit the manure to be forced upwardly out the outlet port 89 and through the pipe 90 and out the spout 92. The manure in the storage pit can thus be mixed up or agitated. The distribution of the flow of manure from the spout 92 may be controlled by swinging the handle 94 as desired, so as to direct the output from the spout 92 in a desired direction.

As shown in FIG. 2, the selector valve 95 has an elongated control rod 97 operatively connected by suitable means to the valve shaft 96 for rotating the shaft 96 and the valve 95 which is fixed thereto. The selector valve control rod 97 is rotatably supported in a suitable support sleeve or bearing 98 which is fixedly secured by any suitable means, as by machine screws 99 between the pipe support brackets 85. The rear end of the control rod 97 is turned to a right angle position to form a handle 100 for rotating the control rod and moving the selector valve 95 between its two operating positions.

In use, it will be seen that the pump of the present invention may be quickly and easily attached to a tractor 12 by means of the hitch 11 and then moved to a manure storage pit for loading manure into a tank on a spreader or truck for spreading over a field. The pump is moved into the manure at an acute angle relative to the ground level so that the auger 55 can move manure into the impeller house 75 and then upwardly out the pipe 83 to a tank on a spreader or truck. It will be seen that the pump of the present invention can also be used for agitating manure in a storage pit by merely moving the selector valve 95 so as to close off the outlet port 82 and open the outlet port 89. The distribution of the manure in the pit may then be controlled by rotating the spout 92 in the desired direction.

FIGS. 5 and 6 show a second embodiment of a pit pump made in accordance with the principles of the present invention. The numeral 102 generally designates the pump in FIG. 2. The pump 102 includes a support frame which comprises a pair of laterally spaced apart horizontal longitudinal bars 103 and 104, as shown in FIG. 6. As shown in FIGS. 5 and 6, a vertically disposed ground engaging stand 105 is fixedly secured to the frame support bar 103 by any suitable means, as by welding. As shown in FIG. 6, a similar vertical stand 106 is fixedly secured, as by welding, to the longitudinal frame bar 104. As shown in FIG. 5, the pump support frame includes a pair of sloping side plates 107 and 108 which converge upwardly and which are fixedly secured to the longitudinal bars 104 and 103, respectively, in the same manner as the side plates 16 and 17 of the first embodiment. It will be seen from FIGS. 5 and 6, that the pump support frame is provided with an upper hitch pivot pin 22a and a pair of lower hitch pivot pins 30a for attaching the support frame to a lift hitch 11 as in the first embodiment.

As shown in FIGS. 5 and 6, the pump 102 includes a transverse axle or shaft 109 which is pivotally mounted by a pair of integral end shafts 110 and lock nuts 111 between the support frame bars 103 and 104. The attachment of the shaft 109 is such that it may be pivoted about the axis of the pivot shafts 110 and relative to the support frame. The pump 102 is provided with an inverted channel shaped elongated main frame 112 which has its rear end fixedly secured to the transverse shaft 109 by any suitable means, as by welding.

As shown in FIG. 5, the pump 102 includes an elongated drive shaft 114 which is pivotally supported at its front end by a suitable bearing 115 operatively mounted in the transverse shaft 109. The front end of the shaft 114 extends through a suitable opening through the transverse shaft 109 and through the bearing 115. The shaft 114 is rotatably supported at an intermediate point by a bearing block 116 operatively mounted in the main frame 112. A second suitable bearing block 117 is mounted in the rear end of the frame 112 and rotatably supports the shaft 114 at that point.

As shown in FIG. 5, the front end of the pump drive shaft 114 is indicated by the numeral 118 and it is splined and operatively connected with the universal joint output portion 119. The universal joint input portion 120 is operatively connected to the shaft 121 which would be operatively connected to the power output shaft of a tractor 12 in the same manner as described for the first embodiment shown in FIG. 3.

As shown in FIG. 5, the pump drive shaft 114 extends into an impeller housing, generally indicated by the numeral 124. The impeller housing 124 includes a circular lower and side wall portion, generally indicated by the numeral 126, and an integral rear end wall 125 through which the shaft 114 extends. The front end of the housing 124 is indicated by the numeral 127 and it is open for the insertion of manure into the lower end of the housing 124, as described in detail hereinafter.

As illustrated in FIGS. 5 and 6, the upper end portion 128 of the impeller housing 124 is enclosed on all sides but it is open on the bottom so as to communicate with the lower portion of the impeller housing. The upper end portion 128 of the impeller housing 124 is provided with a first outlet port 129 which communicates with an outlet pipe 130. Operatively mounted in the outlet pipe 130 is the inlet end of an elongated manure transfer pipe 131. The transfer pipe 131 is suitably supported by a support collar 132 which is fixedly connected, as by welding, to the upper end of a vertical support column or post 113. As shown in FIG. 6, the support column 113 has a V-shaped horizontal cross section and its lower end is fixedly secured, as by welding, to the transverse axle 109 and the main frame 112. As shown in FIG. 5, the rear or outlet end of the transfer pipe 131 is provided with a tubular, flexible attachment collar 133 which is flexible and which is adapted to be attached to a second pipe for carrying manure to a tank mounted on a spreader vehicle or a truck. The flexible sleeve 133 permits the entire pump structure to be pivoted about the pivot shafts 110 and yet maintain a connection with another pipe leading into the tank.

A second outlet port 136 is provided at the upper end of the impeller housing upper end portion 128. The outlet port 136 communicates with a rotatable outlet pipe 137 to which is attached a spout 138. The outlet pipe 137 is rotatably mounted by any suitable means on the impeller housing upper end portion 128. A circular gear 139 is fixedly mounted around the pipe 137 and it is meshably engaged by a worm gear 140 that is carried on a rotatably mounted shaft 141. The shaft 141 is rotatably mounted on suitable brackets 148 which are fixedly supported on the impeller housing upper end portion 128. An elongated control shaft 142 has its front end operatively attached by suitable means to the rear end of the shaft 141 for turning the shaft 141 and the worm gear 140 so as to turn the circular gear 139 and the spout 138 to a desired discharge position. A control shaft 142 extends through the vertical support column 113 and it is rotatably supported on the column 113 by a suitable bearing means 143. As shown in FIG. 5, the control shaft 142 is provided with a handle 144 for manual turning of the shaft 142.

As shown in FIG. 5, the front end of the shaft 114 extends through the impeller housing 124 and it has fixedly mounted thereon a multi-blade impeller 145, as for example, an impeller with four blades spaced 90° apart. The impeller 145 is fixedly secured to the shaft 114 by any suitable means, as by a lock-screw 146.

As shown in FIG. 5, a left hand auger, generally indicated by the numeral 147, is fixedly secured by any suitable means on the forward end of the shaft 114, outward of or beyond the front side of the impeller housing 124. As viewed from the left end of FIG. 5, the shaft 114 and the left hand auger 142 would be turned counterclockwise so as to force manure through the open front side of the impeller housing 124 for engagement by the impeller 145, and thence upwardly into the upper end portion 128 of the impeller housing 124.

As shown in FIG. 5, the first outlet port 129 is normally closed by a selector valve or two-way valve 149 similar to the selector valve 95 of the first embodiment. The selector valve 149 is fixedly mounted on a horizontally disposed shaft 150 which has its ends operatively supported in the upper end portion 128 of the impeller housing 124. A lever 151 has its lower end fixedly attached to one end of the shaft 150 which extends out of the housing portion 128, and its upper end pivotally attached by a pivot pin 152 to the front end of an elongated selector valve control rod 153. As shown in FIG. 5, the rear end of the control rod 153 is slidably supported in a suitable support bracket 154 that is fixed on the vertical support column 113. The rear end of the control rod 153 is turned sidewardly to provide a handle 155.

An elongated lever 156 has one end fixed to the other end of the shaft 150 that extends out of the housing portion 128, and it is angularly displaced from the valve 149, and in a position below the horizontal plane so as to provide a weight that creates normal clockwise rotation on the shaft 150 to normally maintain the valve 149 in the closed solid line position shown in FIG. 5. The second outlet port 136 is normally open and it is closed when the valve 149 is moved counterclockwise, as viewed in FIG. 5, from the solid line position to the broken line position indicated by numeral 157. This last mentioned movement is effected by grasping the handle 155 and pulling the rod 153 to the left, as viewed in FIG. 5, so as to pivot the shaft 150 counterclockwise.

An elongated support truss or rod 158 has the front end thereof fixedly attached to an attachment bracket 159 which is secured to the front end of the elongated main frame 112. As shown in FIG. 5, the support rod 158 angles upwardly and rearwardly, and it extends through a suitable opening 160 through the vertical support column 113. The support rod 158 is secured in position relative to the vertical column 113 by a pair of suitable lock nuts 161 which are threadably mounted on the threaded rear end of the support rod 158.

The pump 102 may be pivoted about the pivot shafts 110 by a suitable hydraulic cylinder, generally indicated by the numeral 162 in FIG. 5. The cylinder 162 would be operatively connected by suitable fluid conduits to the source of pressurized fluid normally carried on the tractor 12 for operating accessories pulled by a tractor, such as farming implements. The head end of the cylinder 162 is pivotally mounted by a suitable pivot pin 163 on one end of an attachment arm 164 that has its other end fixed by any suitable means, as by a machine screw 165, to the support frame side plates 107 and 108. The cylinder rod 166 of the cylinder 162 has a yoke on its outer end which is pivotally mounted by a suitable pivot 167 on an attachment bracket 168. The bracket 168 is fixedly secured, as by welding, to the vertical support column 113. It will be seen, that the pump 102 may be pivoted about the pivot shafts 110 by operating the hydraulic cylinder 162 in a desired direction. That is, when the cylinder 162 is operated so as to move the cylinder rod 166 outwardly thereof, the pump 102 will be pivoted clockwise, as viewed in FIG. 5. When the cylinder 162 is operated so as to move the rod 166 inwardly, the pump 102 will be pivoted counterclockwise so as to move the pump upwardly.

In use, the pump 102 is operatively attached to the tractor 12 and positioned at a desired angle relative to a manure storage pit, and then it is moved inwardly of the pit so as to move the auger 147 into the manure. Power is supplied to the shaft 114 and the auger 147 then moves the manure into the impeller housing 124. The impeller 145 then moves the manure upwardly and out of the housing portion 128 through either the first outlet port 129 or the second outlet port 136, in accordance with the position of the valve 149.

While it will be apparent that the preferred embodiments of the invention herein disclosed are well calculated to fulfill the objects above stated, it will be appreciated that the invention is susceptible to modification, variation and change.

What is claimed is:

1. In a manure storage pit pump for attachment to a tractor having a power output shaft and a hitch means, the combination comprising:
   a. a support frame pivotally attached to said hitch means;
   b. an elongated main frame having one end operatively supported by said support frame;
   c. an elongated drive shaft rotatably supported on said main frame;
   d. means operatively connecting one end of said drive shaft to said tractor power output shaft for rotating said drive shaft;
   e. an impeller means carried on said main frame and being operable by said drive shaft;
   f. an auger means operatively attached to the end of said drive shaft for moving manure from a manure storage pit into said impeller means;
   g. pipe means being operatively connected to said impeller means for receiving manure from said impeller means;
   h. said means operatively connecting one end of said drive shaft to said tractor power output shaft comprising a universal joint means;
   i. said impeller means including,
      1. a housing carried on said main frame;

2. an impeller operatively mounted on said drive shaft and disposed within said housing for receiving manure and forcing the manure into a discharge port means formed in said housing; and
3. said pipe means being operatively connected to said discharge port means in said housing;
j. said discharge port means in said impeller housing including a first outlet port and a second outlet port;
k. said pipe means including a transfer pipe operatively connected to said first outlet port for conveying manure from the impeller housing to a manure transfer vehicle;
l. said pipe means including a rotatably mounted spout operatively connected to said second outlet port for discharging manure from said impeller housing back into the manure storage pit;
m. said discharge port means including a pivotally mounted selector valve for selective opening and closing of said first and second outlet ports; and,
n. the other end of said elongated main frame being unsupported and freely movable up and down for moving the auger means into the manure in a manure storage pit.

2. A manure storage pit pump as defined in claim 1, wherein:
a. said selector valve is provided with means for pivoting the selector valve between one position to close said first outlet port and open said second outlet port, and another position to open said first outlet port and close said second outlet port.

3. A manure storage pit pump as defined in claim 1, wherein:
a. said rotatably mounted spout is provided with means for rotating said spout.

4. A manure storage pump as defined in claim 1, wherein:
a. said auger means comprises at least one auger for moving manure into said impeller housing.

5. A manure storage pit pump as defined in claim 1, wherein:
a. said auger means comprises a plurality of augers for moving manure into said impeller housing.

6. A manure storage pit pump as defined in claim 1, wherein:
a. said main frame has one end fixed to said support frame, and said support frame is pivotally attached to said hitch means.

7. A manure storage pit pump as defined in claim 1, wherein:
a. said main frame has one end pivotally mounted on said support frame;
b. said support frame is pivotally attached to said hitch means; and,
c. a power operated apparatus is operatively mounted on said support frame and engages said main frame for pivoting the main frame relative to said support frame.

8. A manure storage pit pump as defined in claim 7, wherein:
a. said power operated apparatus comprises a fluid operated cylinder having a head end and a cylinder rod end, and having the head end thereof pivotally attached to said support frame, and the cylinder rod thereof pivotally attached to said main frame.

* * * * *